(12) United States Patent
Mahler

(10) Patent No.: US 11,338,238 B2
(45) Date of Patent: May 24, 2022

(54) AEROSOL DISTRIBUTION IN FILTER TESTING SYSTEMS

(71) Applicant: Camfil AB, Stockholm (SE)

(72) Inventor: Axel Mahler, Grossensee (DE)

(73) Assignee: Camfil AB, Stockholm (SE)

( * ) Notice: Subject to any disclaimer, the term of this patent is extended or adjusted under 35 U.S.C. 154(b) by 134 days.

(21) Appl. No.: 16/817,849

(22) Filed: Mar. 13, 2020

(65) Prior Publication Data

US 2020/0289971 A1 Sep. 17, 2020

(30) Foreign Application Priority Data

Mar. 14, 2019 (SE) .................................... 1950323-4

(51) Int. Cl.
*B01D 46/44* (2006.01)
*G01M 3/20* (2006.01)

(52) U.S. Cl.
CPC ............. *B01D 46/442* (2013.01); *G01M 3/20* (2013.01); *B01D 2273/18* (2013.01)

(58) Field of Classification Search
CPC ........................... B01D 46/0086; B01D 46/42; B01D 2273/18; B05B 3/12; B05B 1/20; G01M 3/20; G01N 2015/084; G01N 15/00
See application file for complete search history.

(56) References Cited

U.S. PATENT DOCUMENTS

| 1,390,310 A | * | 9/1921 | Plumer | ...................... B05B 3/06 239/253 |
| 2,301,025 A | * | 11/1942 | Friend | ...................... C02F 3/043 261/95 |

(Continued)

FOREIGN PATENT DOCUMENTS

| EP | 2191882 A1 | 6/2010 | |
| EP | 2196250 A2 | * 6/2010 | ........... B01D 46/442 |
| EP | 2226110 A1 | 9/2010 | |

OTHER PUBLICATIONS

ESPACENET Machine Translation of EP 2196250 A2 Which Originally Published On Jun. 16, 2010. (Year: 2010).*

(Continued)

*Primary Examiner* — David A. Rogers
(74) *Attorney, Agent, or Firm* — Dinsmore & Shohl LLP

(57) ABSTRACT

An aerosol distributor and an arrangement for filter leakage detection in a gas filtration system comprising such aerosol distributor, the aerosol distributor being configured to be positioned in a gas stream upstream of the filter, said aerosol distributor comprising: a housing comprising a primary chamber in fluid connection with two or more secondary chambers; the housing having an inlet for admitting a test aerosol from an aerosol source into the primary chamber and passages for releasing the test aerosol from the primary chamber into each of the secondary chambers; said secondary chambers being elongated and provided with a plurality of outlet holes along the length thereof for releasing the test aerosol from the secondary chambers into a gas stream surrounding the aerosol distributor; characterized in that the dimensions of the inlet, the primary chamber, the passages, the secondary chambers and the outlet holes are selected such that during operation, the pressure of the test aerosol in the primary chamber will be higher than the pressure of the test aerosol in the secondary chambers.

13 Claims, 3 Drawing Sheets

(56) References Cited

U.S. PATENT DOCUMENTS

| | | | | |
|---|---|---|---|---|
| 2,347,739 A | * | 5/1944 | Higgins | A01K 13/003 119/669 |
| 2,532,918 A | * | 12/1950 | Hungerford, Jr. | F16L 41/002 137/561 A |
| 2,910,865 A | * | 11/1959 | Opdyke | G01P 5/001 73/147 |
| 3,215,274 A | * | 11/1965 | Schreiber | C02F 3/043 210/150 |
| 3,361,361 A | * | 1/1968 | Schutte | A47L 15/23 239/227 |
| 3,765,225 A | * | 10/1973 | Rivers | G01M 3/20 73/40.7 |
| 3,803,921 A | * | 4/1974 | Dieterich | G01N 1/2035 73/203 |
| 3,887,131 A | * | 6/1975 | Bourne | B01D 53/34 239/110 |
| 4,055,075 A | * | 10/1977 | Allan | G01M 3/00 73/40.7 |
| 4,324,568 A | * | 4/1982 | Wilcox | B01D 46/0013 239/514 |
| 4,494,403 A | * | 1/1985 | Bowers | B01D 46/0006 73/40.7 |
| 4,515,007 A | * | 5/1985 | Herman | G01M 3/20 55/DIG. 9 |
| RE31,952 E | * | 7/1985 | Wilcox | B01D 46/0004 239/514 |
| 4,580,597 A | * | 4/1986 | Cordingley | B01F 15/0264 137/561 A |
| 4,683,762 A | * | 8/1987 | Aurich | G01M 3/20 73/40.7 |
| 4,875,360 A | * | 10/1989 | Ziemer | G01M 3/20 73/40.7 |
| 4,884,585 A | * | 12/1989 | Oh | A47L 15/20 134/176 |
| 4,997,000 A | * | 3/1991 | Feast | D06F 18/00 134/170 |
| 5,124,133 A | * | 6/1992 | Schoenrock | B01D 15/08 210/286 |
| 5,620,144 A | * | 4/1997 | Strock | B01D 53/504 239/557 |
| 5,836,520 A | * | 11/1998 | Bhandarkar | H05K 3/1233 239/553.5 |
| 6,042,090 A | * | 3/2000 | Zablonier | B01D 3/008 202/158 |
| 6,053,185 A | * | 4/2000 | Beevers | A47L 15/488 134/102.3 |
| 7,010,960 B1 | * | 3/2006 | Grantham | G01M 3/00 73/40 |
| 7,186,286 B2 | * | 3/2007 | Morse | B01D 46/0086 55/417 |
| 7,669,490 B2 | * | 3/2010 | Yoshitome | F24F 3/167 73/865.8 |
| 7,758,716 B2 | * | 7/2010 | Lee | H05K 3/068 156/345.21 |
| 7,823,800 B1 | * | 11/2010 | Kalpakoff | A01G 25/06 239/1 |
| 8,133,310 B2 | * | 3/2012 | Huza | B01D 46/4272 96/413 |
| 9,186,610 B2 | * | 11/2015 | Woolard | B01D 46/0027 |
| 9,360,411 B2 | * | 6/2016 | Woolard | G01M 3/04 |
| 9,468,880 B2 | * | 10/2016 | Woolard | B01D 46/10 |
| 9,518,735 B2 | * | 12/2016 | Shepherd | F23J 15/04 |
| 9,772,271 B2 | * | 9/2017 | Peacock | G01N 15/06 |
| 10,006,848 B2 | * | 6/2018 | Woolard | G01N 15/0806 |
| 10,180,384 B2 | * | 1/2019 | Verma | G01N 15/0806 |
| 10,578,521 B1 | * | 3/2020 | Dinakaran | G01N 1/2205 |
| 10,976,212 B2 | * | 4/2021 | Kawasaki | B01D 46/42 |
| 2006/0042359 A1 | * | 3/2006 | Morse | G01M 3/3281 73/40 |
| 2006/0272301 A1 | * | 12/2006 | Morse | B01D 46/444 55/439 |
| 2010/0154513 A1 | * | 6/2010 | Lin | B01D 46/42 73/38 |
| 2013/0192344 A1 | * | 8/2013 | Bryan | B01D 39/1692 73/38 |
| 2015/0352605 A1 | * | 12/2015 | Tiwari | A61M 1/06 134/105 |
| 2016/0097706 A1 | | 4/2016 | Woolard | |
| 2016/0256809 A1 | * | 9/2016 | Woolard | B01D 46/10 |
| 2016/0297042 A1 | * | 10/2016 | Koik | B23Q 11/1076 |
| 2016/0324393 A1 | * | 11/2016 | Xu | A47L 15/22 |
| 2019/0053686 A1 | * | 2/2019 | Weigle | A47L 15/488 |
| 2019/0265122 A1 | * | 8/2019 | Kawasaki | B01D 46/46 |
| 2020/0022795 A1 | * | 1/2020 | Haupt | A01K 1/06 |
| 2020/0289971 A1 | * | 9/2020 | Mahler | B05B 1/20 |
| 2020/0292405 A1 | * | 9/2020 | Petersen | B05B 7/0884 |
| 2020/0391233 A1 | * | 12/2020 | Woolard | G01M 3/20 |
| 2020/0400545 A1 | * | 12/2020 | Berryessa | G01N 15/082 |

OTHER PUBLICATIONS

European Search Report dated Jul. 24, 2020 relating to European Application No. 20162741.1-1001.

* cited by examiner

AEROSOL DISTRIBUTION IN FILTER TESTING SYSTEMS

CROSS-REFERENCE TO RELATED APPLICATIONS

This application claims priority to Swedish Patent Application No. 1950323-4 filed Mar. 14, 2019, the contents of which are hereby incorporated by reference in their entirety.

FIELD OF THE INVENTION

The present invention relates generally to arrangements for filter leakage detection in gas filtration systems, and more specifically to aerosol distributors for achieving an even distribution of a test aerosol in the gas stream upstream of the filter to be tested.

BACKGROUND OF THE INVENTION

In some environments where undesired substances are removed from a gas, such as air, by filtering the gas, it is important to be able to check in situ that the filter is working and detect any leakage of the filter. One way of checking the filter is to use a filter testing system, wherein a particulate test substance, typically an aerosol, is injected into the gas stream upstream of the filter, and gas is collected downstream of the filter using a sampling probe. The collected gas is then analyzed with respect to occurrence of the undesired substance.

Testing of filters and filter installations for removal of particles from a gas can for example utilize a monodisperse or polydisperse aerosol of an oil, e.g. dioctyl phthalate (DOP), di-ethyl-hexyl-sebacat (DENS) DEHS or poly alpha olefins (PAO). Other typical aerosols used are an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. The aerosol is introduced into the gas stream at a point in the duct far enough upstream of the filter or filter bank to assure complete dispersion by the time it reaches the filter or bank of filters.

An upstream sampling probe is often provided immediately upstream of the filter to determine the concentration of the aerosol in the duct, and a downstream sampling probe is provided to detect filter leakage. During testing, a portion of the gas stream is withdrawn from the duct through the sampling probes and conveyed to an external instrument, such as a photometer or a particle counter or the like, which is used to determine the aerosol concentration in both the upstream and downstream samples.

The downstream sampling probe may be movable in a plane parallel to the filter surface, such that the filter surface can be scanned using the sampling probe. This type of scanning sampling probe allows detection of not only the existence of a leak, but can also give rough indication as to the position of the leak on the filter surface. A typical sampling probe is made of a tube with several inlet holes through the tube wall distributed along the length of the sampling probe, and a central outlet.

In order for the leak detection to be accurate, it is important that the aerosol particles are evenly distributed in the gas flow when it reaches the filter so that the aerosol particle load is evenly distributed across the filter area. If the filter is subjected to an uneven particle distribution, e.g. a higher particle concentration towards the middle of the filter and a lower concentration towards the filter edges, this may cause a lower sensitivity to leaks at the edges of the filter compared to leaks positioned closer to the middle of the filter.

If the test aerosol is injected into the gas stream via a single injection point, the injection point must be positioned sufficiently far from the filter to allow the aerosol particles to become evenly distributed before they reach the filter surface. This may drastically increase the space requirements of the filter testing system. In installations where multiple filters are employed in series, the space requirements for introducing the test substance, and withdrawing the samples, are multiplied since the filters must be separated by a distance sufficient to allow proper particle distribution.

Generally, for the aerosol to be completely mixed with the surrounding airflow, the aerosol should be introduced into the airflow at a point that is upstream of the location where it needs to be completely mixed by at least 10 cross-sectional dimensions of the duct through which the airflow is traveling. However, such dimensional requirements can result in a test section that is significantly longer than a conventional filter arrangement, which accordingly undesirably requires a larger foot print along with increased material costs. Alternatively, baffles or other mixing elements may be disposed between the aerosol injection point and the filter to provide adequate mixing over a shorter length. However, the addition of mixing elements significantly restricts the airflow through the filter arrangement. Thus, a larger fan, blower, or the like must be used, which also uses more power to achieve a desired airflow, than if such elements were not present. The larger fan increases equipment cost, while the increased airflow resistance consumes more energy, making the system more expensive to operate.

While the aerosol distributor should provide a uniform particle distribution, it is also important that the contribution of the aerosol distributor to the overall pressure drop over the filter testing system is as low as possible.

A common prior art solution for improving aerosol particle distribution in filter testing systems includes an arrangement of interconnected perforated tubes connected to an aerosol source. Aerosol from the aerosol source is fed to the tubes and distributed into the gas stream via the perforations. However, this type of arrangement typically does not result in a satisfactory distribution, since a higher amount of particle will pass though the perforations closest to the aerosol source and a lower amount of particles will pass though the perforations further away from the aerosol source.

An alternative solution for aerosol distribution in filter testing systems would therefore be desirable, which combines the properties of efficient aerosol particle distribution allowing the aerosol distributor to be placed close to the filter surface, with a low pressure drop.

SUMMARY OF THE INVENTION

One object of the present disclosure is to provide an aerosol distributor for use in a filter testing system, which alleviates at least some of the problems associated with prior art aerosol distributors.

Another object of the present disclosure is to provide an aerosol distributor which combines the properties of efficient aerosol particle distribution allowing the aerosol distributor to be placed close to the filter surface, with a low pressure drop.

The above objects as well as other objects that will become apparent to the skilled person in the light of the present disclosure are achieved by the various aspects of the invention as set out herein.

According to a first aspect of the disclosure, there is provided an aerosol distributor for filter leakage detection in a gas filtration system, said aerosol distributor being configured to be positioned in a gas stream upstream of the filter, said aerosol distributor comprising:

a housing comprising a primary chamber in fluid connection with two or more secondary chambers, the housing having an inlet for admitting a test aerosol from an aerosol source into the primary chamber and passages for releasing the test aerosol from the primary chamber into each of the secondary chambers, said secondary chambers being elongated and provided with a plurality of outlet holes along the length thereof for releasing the test aerosol from the secondary chambers into a gas stream surrounding the aerosol distributor, wherein the dimensions of the inlet, the primary chamber, the passages, the secondary chambers and the outlet holes are selected such that during operation, the pressure of the test aerosol in the primary chamber will be higher than the pressure of the test aerosol in the secondary chambers.

The aerosol distributor can be permanently mounted upstream of a filter in a filter housing where the filter integrity needs to be tested regularly or occasionally. The aerosol distributor function is to distribute an aerosol, e.g. in the form of a carrier stream containing a very fine aerosol of oil particles through a number of small outlet holes into the gas flow upstream of the filter. The aerosol may for example be a monodisperse or polydisperse aerosol of an oil, e.g. dioctyl phthalate (DOP), di-ethyl-hexyl-sebacat (DEHS) DEHS or poly alpha olefins (PAO). Other examples of aerosols that may be used include an aerosol of solid particles of e.g. salt or silica, an aerosol of a polystyrene latex, or an aerosol of viable or non-viable cells. For the testing of molecular filters, gaseous challenge compounds, e.g. toluene or butane in air may also be used. Downstream of the filter, an aerosol sampling probe is typically used to detect filter leakage. In order for the leak detection to be accurate, it is important that the aerosol particles are evenly distributed in the gas flow when it reaches the filter so that the aerosol particle load is evenly distributed across the filter area.

The inventive aerosol distributor having a primary chamber and one or more secondary chambers connected to the primary chamber, wherein the dimensions of the inlet, the passage and the outlet holes are selected such that during operation, the pressure of the test aerosol in the primary chamber will be higher than the pressure of the test aerosol in the secondary chambers has been found to provide a significant improvement in the aerosol distribution compared to prior art gas distributors of single chamber type.

The inventive aerosol distributor has been found to be able to reduce the particle distribution deviation across the filter area by up to 50% compared to a corresponding prior art gas distributor. The inventive two-chamber design makes the distribution of aerosol from the primary chamber into the secondary chambers more even. It is further believed that the reduction of the aerosol pressure in the secondary chambers caused by the dimensions of the inlet, the passage and the outlet holes leads to a more even distribution of the aerosol flow through the outlet holes and thereby a more even distribution of aerosol in the gas downstream of the aerosol distributor.

The reduction of the particle distribution deviation obtained with the two-chamber design allows for the aerosol distributor to be placed closer to the filter surface, which in turn allows for a reduction of the build depth and reduced size of the filter testing arrangement. A corresponding prior art gas distributor typically requires a distance of at least 400 mm from the upstream surface of the filter. With the two-chamber design, this distance may be considerably reduced.

With the inventive aerosol distributor, a significant improvement of the aerosol distribution can be achieved without an increase in pressure drop since the inventive aerosol distributor can be designed with the same exterior dimensions and shape as a conventional perforated tube gas distributor of single chamber type.

The effect of the inventive two-chamber system is believed to be especially pronounced because of the typically relatively low pressure of the aerosol that is fed to the aerosol distributor. The aerosol pressure from the aerosol source is typically in the range of 0.1-5 bar, preferably in the range of 0.2-3 bar. Thus, in some embodiments, the aerosol distributor further comprises an aerosol source adapted to feed a test aerosol to the inlet of the housing at a pressure in the range of 0.1-5 bar, preferably in the range of 0.2-3 bar.

In the inventive aerosol distributor, the dimensions of the inlet, the primary chamber, the passages, the secondary chambers and the outlet holes, and particularly the dimensions of the inlet, the passage and the outlet holes, are selected such that during operation, the pressure of the test aerosol in the primary chamber will be higher than the pressure of the test aerosol in the secondary chambers. In some embodiments, this means that the test aerosol flow velocity through the passages during operation of the aerosol distributor will be higher than the test aerosol flow velocity through the outlet holes.

This can be achieved, e.g. by having a total cross sectional area of the passage into a secondary chamber, which is equal to or smaller than a total cross sectional area of the outlet holes of the same secondary chamber. Thus, in some embodiments, a total cross sectional area of the passage into a secondary chamber is equal to or smaller than a total cross sectional area of the outlet holes of the same secondary chamber. In some embodiments, a total cross sectional area of the passage into a secondary chamber is smaller than a total cross sectional area of the outlet holes of the same secondary chamber. It can also be achieved by having a total cross sectional area of the passage into a secondary chamber, which is smaller than the cross sectional area of each of the primary and secondary chambers in a plane perpendicular to the general aerosol flow direction. In other words, wherein the dimensions of the passage causes a restriction of the aerosol flow from the primary chamber to the secondary chamber.

The aerosol distributor housing comprises at least two secondary chambers connected to the primary chamber. Having two or more secondary chambers allows for the outlet holes to be evenly distributed across a cross-sectional area of the gas stream. This way, aerosol can be evenly distributed into the gas stream. Additional secondary chambers can be used to further improve the distribution of the outlet holes. In some embodiments, the housing comprises 2-20 secondary chambers, preferably 2-16 secondary chambers, more preferably 4-12 secondary chambers.

While the aerosol distributor should provide a uniform particle distribution, it is also important that the contribution of the aerosol distributor to the overall pressure drop over the filter testing system is as low as possible. The shape of the housing should therefore preferably be designed for minimum airflow resistance. Therefore, in some embodiments, the elongated secondary chambers are tubular.

The elongated secondary chambers are preferably designed with a proximal end attached to the primary chamber and a closed distal end.

According to a second aspect of the disclosure, there is provided an arrangement for filter leakage detection in a gas filtration system, comprising:
a filter housing for sealably mounting a filter within said housing such that an gas stream passing through the housing passes through the filter, and
an aerosol distributor positioned in the gas stream upstream of the filter for releasing a test aerosol from an aerosol source into the gas stream,
wherein the aerosol distributor comprises a housing comprising a primary chamber in fluid connection with two or more secondary chambers,
the housing having an inlet for admitting a test aerosol from an aerosol source into the primary chamber and passages for releasing the test aerosol from the primary chamber into each of the secondary chambers,
said secondary chambers being elongated and provided with a plurality of outlet holes along the length thereof for releasing the test aerosol from the secondary chambers into a gas stream surrounding the aerosol distributor,
wherein the dimensions of the inlet, the primary chamber, the passages, the secondary chambers and the outlet holes are selected such that during operation, the pressure of the test aerosol in the primary chamber will be higher than the pressure of the test aerosol in the secondary chambers.

The aerosol distributor of the arrangement of the second aspect may be further defined as described above with reference to the first aspect of the disclosure.

Downstream of the filter, an aerosol sampling probe is typically used to detect filter leakage. Thus, in some embodiments, the filter testing system further comprises:
a sampling probe positioned in the gas stream downstream of the filter for sampling gas from the gas stream to be analyzed for the presence of test aerosol.

The aerosol distributor may be placed at a conventional distance from the filter (typically about 400 mm) to provide improves aerosol distribution compared to a corresponding single chamber distributor, or it can be placed closer to the filter to provide the same or better aerosol distribution compared to a corresponding single chamber distributor, but with reduced build depth. In some embodiments, the distance of said aerosol distributor from said filter is in the range of 50-500 mm, preferably in the range of 50-250 mm.

The sampling probe can be provided in many different forms and may be fixed or movable. Since it is desirable that the sampling probe does not noticeably interfere with the gas flow it cannot cover the whole area. Different concepts of sampling probes which are moved to scan the filter area have been developed. One kind thereof is an elongated sampling probe, which extends along the length or width of the filter and is moved back and forth perpendicularly of its longitudinal extension to scan the area in the vicinity of the filter surface. A typical elongated sampling probe is made of a tube with several inlet holes through the tube wall distributed along the length of the sampling probe, and a central outlet. This type of sampling probe allows detection of not only the existence of a leak, but can also give rough indication as to the position of the leak on the filter surface.

In some embodiments, the sampling probe is movable in a plane parallel to the filter surface, such that the filter surface can be scanned using the sampling probe.

In some embodiments, the sampling probe instead comprises a series of discrete probes evenly distributed across a cross-sectional area of the filter housing, wherein each discrete probe can be analyzed independently. The series of discrete probes thereby allows detection of not only the existence of a leak, but can also give rough indication as to the position of the leak on the filter surface.

In some cases, especially with a movable sampling probe arranged to scan the filter surface, or a series of discrete probes, it is preferred that the sampling probe is placed close to the filter surface. In some embodiments, the distance of sampling probe from said filter is in the range of 5-100 mm, preferably in the range of 5-25 mm.

Various embodiments of the invention will now be described more in detail with reference to the drawings.

BRIEF DESCRIPTION OF THE DRAWINGS

Referring now to the drawings, which are exemplary embodiments, and wherein.

DETAILED DESCRIPTION OF PREFERRED EMBODIMENTS

Figure 1:
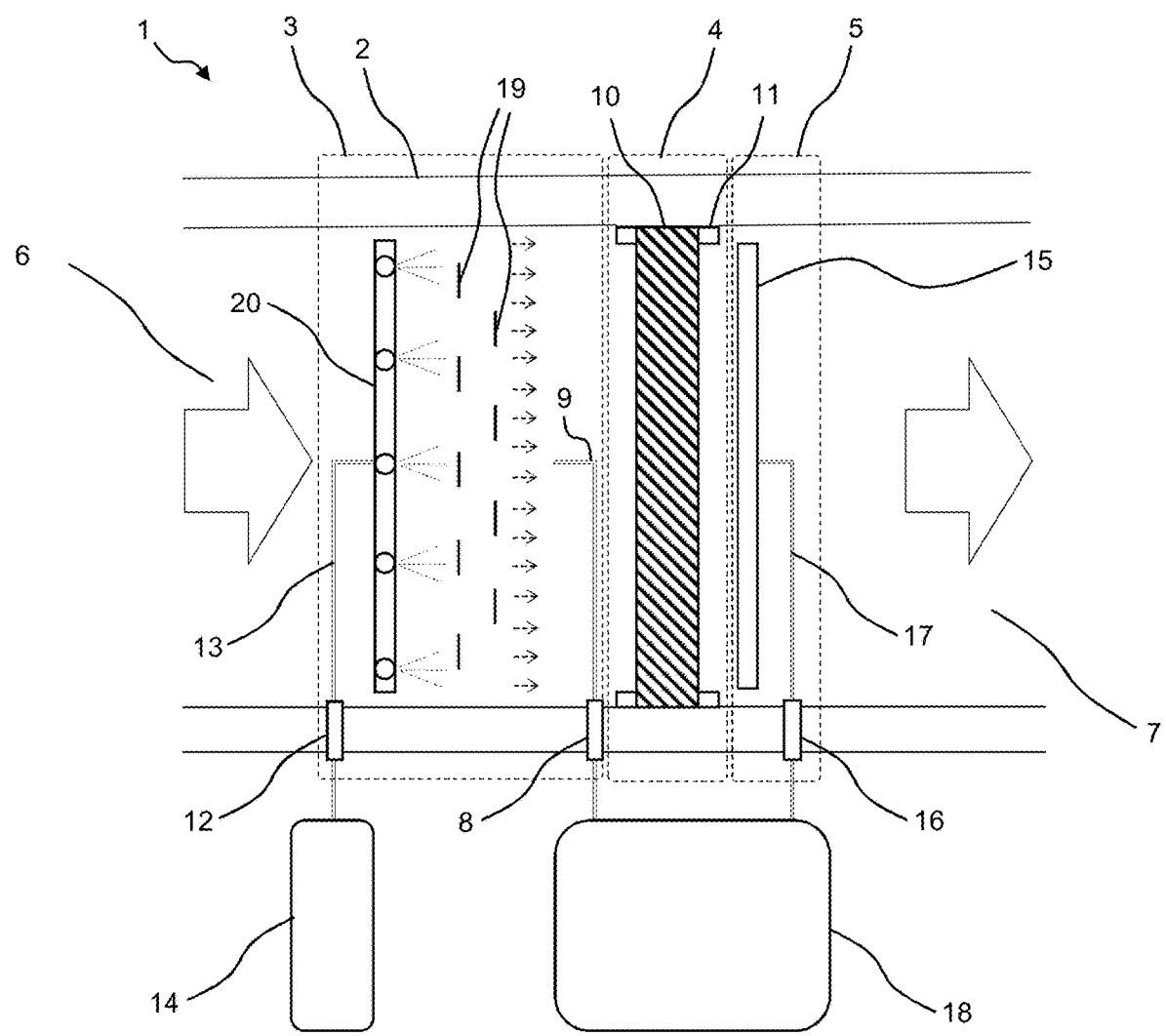
FIG. 1 is a schematic view of a gas filtration system having an arrangement for filter leakage detection.

FIG. 1 illustrates a gas filtration system 1, specifically an air filtration system, comprising an arrangement for filter leakage detection according to various embodiments. The air filtration system 1 includes a filter housing 2 having an upstream test section 3, a filter section 4, and a downstream test section 5 arranged in series. The air filtration system 1 includes an airflow inlet aperture 6 at the upstream end and an airflow outlet 7 aperture at the downstream end.

The filter housing 2 can include one or more doors (not shown) that can be opened to permit access to filters contained therein. The filter housing 2 also includes an upstream sample port 8 formed therethrough, and an upstream sampling probe 9 to allow samples of the aerosol concentration in the airflow upstream of the filter 10 to be obtained during filter testing. The filter section 4 of the filter housing 2 includes a filter mounting mechanism 11 that is substantially aligned with the doors. The filter mounting mechanism 11 receives the filter 10 disposed in the filter section 4 through the doors and can be actuated to sealingly retain the filter in a position within the filter section such that air entering the air filtration system through the airflow inlet aperture 6 and exiting the airflow outlet aperture 7 must pass through and be filtered by the filter 10. The filter mounting mechanism 11 may be any suitable filter clamping mechanism utilized in commercially available gas filtration systems, or other suitable filter clamping system.

The upstream test section 3 is arranged between the airflow inlet aperture 6 and the filter section 4 and includes a duct forming a passageway directing the airflow from the airflow inlet aperture 6 to the filter section 4. An aerosol distributor 20 is arranged in the passageway. Optionally, mixing elements 19 in the form of baffles may be disposed between the aerosol injection point and the filter to provide additional mixing. The aerosol distributor 20 can be connected to and in fluid communication with an aerosol port 12 arranged through the filter housing 2 wall. An aerosol inlet 26 of the aerosol distributor 20 can be connected to the aerosol port 12 by a connecting tube 13. The connecting tube 13 may include rigid or flexible tubing adapted to connect the aerosol distributor 20 to the aerosol port 12. Aerosol from an aerosol source 14 can be introduced into the aerosol port 12 and travel through the connecting tube 13 into the aerosol distributor 20.

Figure 2:
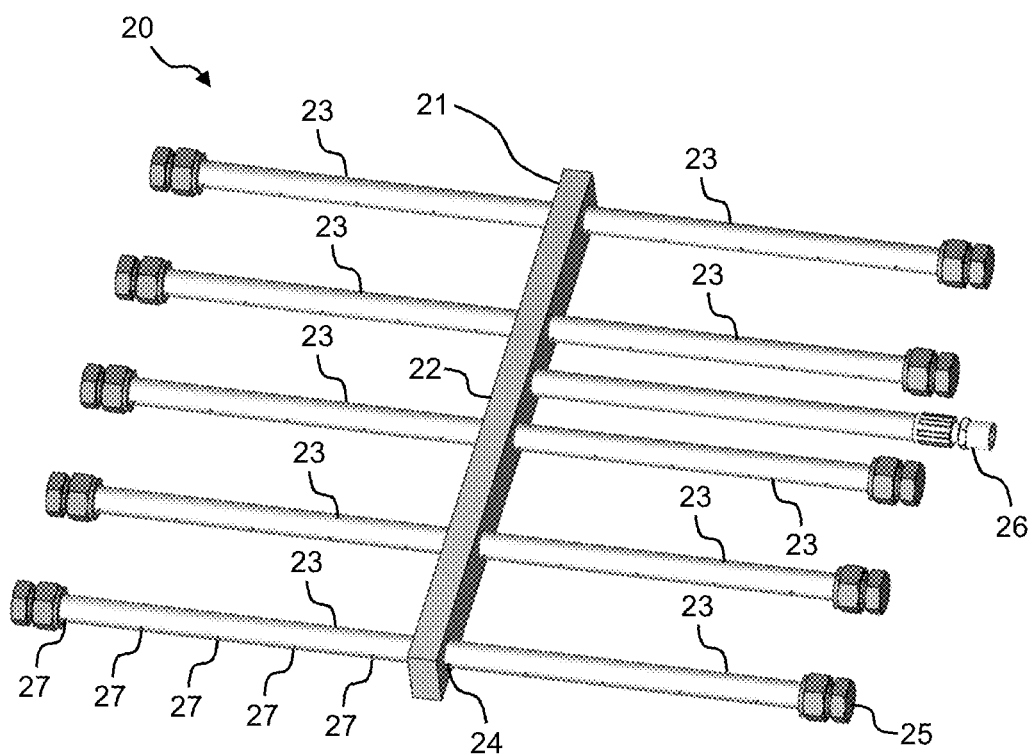
FIG. 2 is a perspective view of an aerosol distributor according to the invention.
Figure 3A:
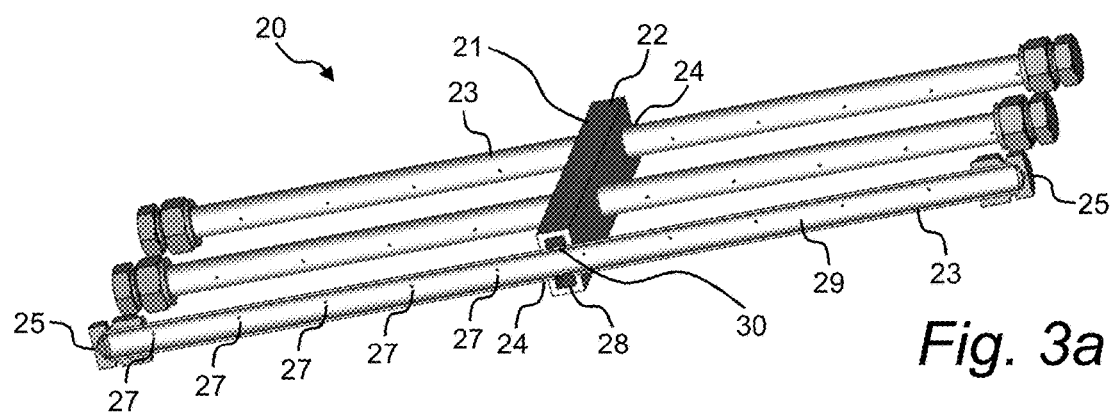
FIGS. 3a and 3b show a cross sectional view of an aerosol distributor according to the invention.
Figure 3B:
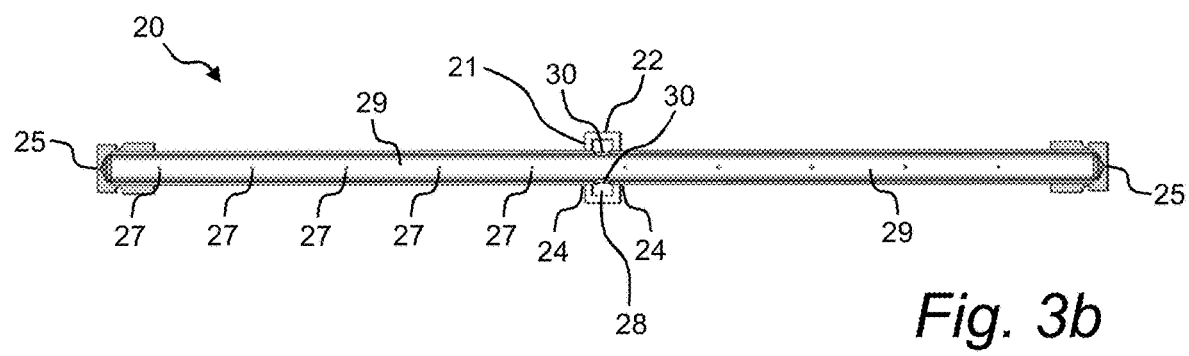

The basic constructional features of an embodiment of the aerosol distributor according to the present disclosure are illustrated in FIGS. 2, 3a and 3b.

The aerosol distributor 20 is comprised of a housing 21 made of metal or plastic comprising a first elongated portion 22 enclosing a primary chamber 28 and a series of elongated tubular portions 23 attached to the first elongated portion 22, each tubular portion 23 enclosing a secondary chamber 29. Each secondary chamber 29 is in fluid connection with the primary chamber 28 at a first proximal end 24 and sealed at the opposite distal end 25.

The housing 21 has an inlet 26 for admitting a test aerosol from an aerosol source 14 via the aerosol port and connecting tube into the primary chamber. The housing includes one or more passages 30 for releasing the test aerosol from the primary chamber 28 into the secondary chambers 29. The passages 30 can be in the form of one or more apertures for each of the secondary chambers.

The secondary chambers 29 are provided with a plurality of outlet holes 27 for releasing the test aerosol from the secondary chambers 29 into the passageway surrounding the aerosol distributor 20.

The dimensions of the inlet, the primary chamber, the passages, the secondary chambers and the outlet holes are selected such that during operation, the pressure of the test aerosol in the primary chamber will be higher than the pressure of the test aerosol in the secondary chambers. Particularly, the dimensions of the inlet 26, the passage and the outlet holes 27 are selected such that during operation, the pressure of the test aerosol in the primary chamber will be higher than the pressure of the test aerosol in the secondary chambers.

As an example, each passage may be in the form of a circular hole, having a diameter of 4 mm, resulting in a total cross sectional area of the passage of about 12.5 mm$^2$, and the outlet holes may be in the form of 10 circular holes, each having a diameter of 1.6 mm, resulting in a total cross sectional area of the outlet holes of about 20 mm$^2$.

The housing 21 of the aerosol distributor 20 is preferably designed such that when it is fitted in the passageway, the outlet holes 27 are evenly distributed across a cross-sectional area of the passageway. This way, aerosol is evenly distributed into the airflow.

The shape of the aerosol distributor 20 is preferably selected so as to correspond to the duct or filter cabinet in which it is to be fitted. As most ducts and cabinets have either a round or square cross sectional geometry, the housing of the aerosol distributor is preferably designed with a round or square overall shape. The housing of the aerosol distributor may typically have an overall width, height or diameter in the range of 100-1300 mm, preferably in the range of 250-650 mm.

As an example, as shown in FIG. 2-3, for a square duct of inside dimensions 610×610 mm the outer dimensions of the housing may be about 610×610 mm or less with a depth in the air flow direction of about 10-50 mm, such that the housing fits in and substantially covers the cross section of the duct. The housing may for example comprise 5 secondary chambers evenly distributed along the length of the primary chamber. Each secondary chamber may comprise 10 outlet holes distributed along the length of each primary chamber, resulting in the housing having 50 outlet holes substantially evenly distributed across a cross-sectional area of the passageway.

The outlet holes typically have a diameter in the range from 1-2 mm. The diameter of the outlet holes 27 in FIG. 2-3 is about 1.6 mm.

In various embodiments, the outlet holes can be arranged on surfaces of the elongated tubular portions that are perpendicular to the general direction of airflow.

The housing 21 is preferably made of plastic or metal. The housing may be assembled from two or more parts, e.g. a first part comprising the primary chamber, to which a number of secondary chambers can be fixed, e.g. by gluing or welding. The inlet and outlet holes can for example be prepared by drilling.

One possible design is demonstrated in FIGS. 3a and 3b where the secondary chambers 29 are comprised of metal pipes fitted through holes in the primary chamber 28. The outlet holes 27 are comprised an array of small circular drilled holes in each of the secondary chambers 29, and the passages 30 are comprised of two circular holes in each of the secondary chambers 29.

The aerosol distributor of FIG. 2-3 is configured to be fitted in a square duct, and the housing is manufactured accordingly. The secondary chambers are of equal length and attached to the primary chamber so as to form a square grid-like structure. In the embodiment shown in FIG. 2 the primary chamber is placed in the middle, with the secondary chambers extending in two directions. In an alternative embodiment, the primary chamber may be placed at one side, with all secondary chambers extending in parallel in the same direction.

It is understood that the aerosol distributor could also be manufactured in other shapes, to fit other duct profiles. For example, the length of the elongated tubular portions could be varied, with shorter tubular portions near the ends of the first elongated portion and longer tubular portions near the middle of the first elongated portion so as to form a circular shape.

In an alternative embodiment, the primary chamber is not elongated, but instead placed centrally in the duct, with secondary chambers extending radially in different directions.

Via the aerosol port 8, the aerosol distributor can be connected to an aerosol source 14 adapted to feed a test aerosol to the inlet of the housing at a pressure in the range of 0.1-5 bar, preferably in the range of 0.2-3 bar.

The downstream test section 5 is arranged between the downstream surface of the filter 9 in the filter housing section 4 and the airflow outlet aperture 7 and includes a duct forming a passageway directing the airflow from the filter 9 to the airflow outlet aperture 7. An aerosol sampling probe 15 is arranged in the passageway. The aerosol sampling probe 15 is positioned in the gas stream downstream of the filter 9 for sampling gas from the gas stream to be analyzed for the presence of test aerosol. Via a tube 17, the sampling probe 15 can be connected to and in fluid communication with a sampling port 16 arranged through the filter housing wall. During testing, a portion of the gas stream is withdrawn from the duct through the sampling probes 9, 15 and conveyed to an external instrument 18, such as a photometer or a particle counter, or the like, which is used to determine the aerosol concentration in both the upstream and downstream samples. The aerosol concentration measured in the samples collected through the sampling probes downstream may optionally be compared to an aerosol concentration measured in the samples collected through the upstream sampling probe 9.

The downstream sampling probe 15 may be movable in a plane parallel to the filter surface, such that the filter surface can be scanned using the sampling probe. This type of sampling probe allows detection of not only the existence of a leak, but can also give rough indication as to the position of the leak on the filter surface.

A typical sampling probe is made of a tube with several inlet holes through the tube wall distributed along the length of the sampling probe, and a central outlet connected to the downstream sampling port. Different concepts for moving the probe to scan the filter surface have been developed. One concept uses an elongated sampling probe, which extends along the length or width of the filter and is movable back and forth in a direction perpendicular to its longitudinal extension by means of a manual or motor driven mechanism like a cylinder, a power screw or other suitable mechanism, to scan the area in the vicinity of the filter surface.

While the invention has been described herein with reference to various exemplary embodiments, it will be understood by those skilled in the art that various changes may be made and equivalents may be substituted for elements thereof without departing from the scope of the invention. In addition, many modifications may be made to adapt a particular situation or feature to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Furthermore, it would be understood by the person skilled in the art what features of the different embodiments can be combined although not explicitly written above.

The invention claimed is:

1. An aerosol distributor for filter leakage detection in a gas filtration system, said aerosol distributor being configured to be positioned in a gas stream upstream of the filter, said aerosol distributor comprising:
   a housing comprising a primary chamber in fluid connection with two or more secondary chambers,
   the housing having an inlet for admitting a test aerosol from an aerosol source into the primary chamber and passages for releasing the test aerosol from the primary chamber into each of the secondary chambers,
   said secondary chambers being elongated and provided with a plurality of outlet holes along the length thereof for releasing the test aerosol from the secondary chambers into a gas stream surrounding the aerosol distributor,
   characterized in that the dimensions of the inlet, the primary chamber, the passages, the secondary chambers and the outlet holes are selected such that during operation, wherein the total cross sectional area of the passage into a secondary chamber is smaller than the cross sectional area of each of the primary chamber and the secondary chamber in a plane perpendicular to the general aerosol flow direction, whereby the dimensions of the passages cause a restriction of the aerosol flow from the primary chamber to the secondary chambers, whereby the pressure of the test aerosol in the primary chamber will be higher than the pressure of the test aerosol in the secondary chambers.

2. The aerosol distributor according to claim 1, characterized in that the aerosol distributor further comprises an aerosol source adapted to feed a test aerosol to the inlet of the housing at a pressure in the range of 0.1-5 bar.

3. The aerosol distributor according to claim 1, characterized in that during operation, the test aerosol flow velocity through the passages will be higher than the test aerosol flow velocity through the outlet holes.

4. The aerosol distributor according to claim 1, characterized in that a total cross sectional area of the passages is equal to or smaller than a total cross sectional area of the outlet holes.

5. The aerosol distributor according to claim 1, characterized in that a total cross sectional area of the passages is smaller than a total cross sectional area of the outlet holes.

6. The aerosol distributor according to claim 1, characterized in that said housing comprises 2-20 secondary chambers.

7. The aerosol distributor according to claim 1, characterized in that said elongated secondary chambers have a proximal end attached to the primary chamber and a closed distal end.

8. An arrangement for filter leakage detection in a gas filtration system, comprising:
   a filter housing for sealably mounting a filter within said housing such that a gas stream passing through the housing passes through the filter, and
   an aerosol distributor positioned in the gas stream upstream of the filter for releasing a test aerosol from an aerosol source into the gas stream,
   characterized in that the aerosol distributor is as defined in claim 1.

9. The arrangement according to claim 8, further comprising:
   a sampling probe positioned in the gas stream downstream of the filter for sampling gas from the gas stream to be analyzed for the presence of test aerosol.

10. The arrangement according to claim 8, characterized in that the distance of said aerosol distributor from said filter is in the range of 50-500 mm.

11. The arrangement according to claim 8, characterized in that the sampling probe is movable in a plane parallel to the filter surface, such that the filter surface can be scanned using the sampling probe.

12. The arrangement according to claim 8, characterized in that the sampling probe comprises a series of discrete probes evenly distributed across a cross-sectional area of the filter housing, wherein each discrete probe can be analyzed independently.

13. The arrangement according to claim 8, characterized in that the distance of sampling probe from said filter is in the range of 5-100 mm.

* * * * *